United States Patent [19]

Nachbur et al.

[11] Patent Number: 4,921,535

[45] Date of Patent: May 1, 1990

[54] HEAT-SENSITIVE RECORDING MATERIAL

[75] Inventors: Hermann Nachbur, Reinach; Rosalinde Braun, Riehen, both of Switzerland

[73] Assignee: Ciba-Geigy Corporation, Ardsley, N.Y.

[21] Appl. No.: 205,877

[22] Filed: Jun. 13, 1988

[30] Foreign Application Priority Data

Jun. 24, 1987 [CH] Switzerland ........................ 2378/87

[51] Int. Cl.[5] .............................................. C09D 11/00

[52] U.S. Cl. ..................................... 106/21; 427/150; 427/151; 503/209; 503/216; 503/218; 503/225; 565/79

[58] Field of Search .................. 106/21; 427/150, 151; 503/209, 216, 218, 225; 564/79

[56] References Cited

U.S. PATENT DOCUMENTS

| | | | |
|---|---|---|---|
| 3,891,703 | 6/1975 | Catt et al. | 564/79 |
| 3,934,070 | 1/1976 | Kimuta et al. | 503/216 |
| 4,111,703 | 9/1978 | Lawton | 106/21 |
| 4,291,901 | 9/1981 | Petitpierre | 427/150 |
| 4,482,905 | 11/1984 | Kaneko et al. | 346/207 |
| 4,531,139 | 7/1985 | Seitz | 427/150 |
| 4,536,220 | 8/1985 | Kondo et al. | 106/21 |
| 4,623,391 | 11/1986 | Seitz | 106/21 |

*Primary Examiner*—Paul Lieberman
*Assistant Examiner*—Helene Klemanski
*Attorney, Agent, or Firm*—Edward McC. Roberts

[57] ABSTRACT

A heat-sensitive recording material whose color reactant system comprises a color former, a developer for said color former and, in addition, a sulfamide compound of formula

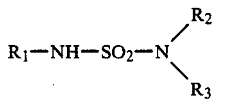

(1)

wherein $R_1$, $R_2$ and $R_3$ are each independently hydrogen, alkyl containing not more than 12 carbon atoms which is unsubstituted or substituted by halogen, hydroxy, cyano or lower alkoxy; $C_5$–$C_{10}$cycloalkyl; phenalkyl, phenyl or naphthyl, each unsubstituted or ring-substituted by halogen, cyano, lower alkyl or lower alkoxy, or —$NR_2R_3$ is 5- or 6-membered, preferably saturated, heterocyclic radical; with the proviso that $R_1$, $R_2$ and $R_3$ may not simultaneously by hydrogen.

6 Claims, No Drawings

HEAT-SENSITIVE RECORDING MATERIAL

The present invention relates to a heat-sensitive recording material whose colour reactant system comprises a colour former, a developer for said colour former and, in addition, a sulfamide compound of formula

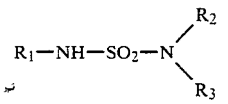 (1)

wherein $R_1$, $R_2$ and $R_3$ are each independently hydrogen, alkyl containing not more than 12 carbon atoms which is unsubstituted or substituted by halogen, hydroxy, cyano or lower alkoxy; $C_5$–$C_{10}$cycloalkyl; phenalkyl, phenyl or naphthyl, each unsubstituted or ring-substituted by halogen, cyano, lower alkyl or lower alkoxy, or —$NR_2R_3$ is a 5- or 6-membered, preferably saturated, heterocyclic radical; with the proviso that $R_1$, $R_2$ and $R_3$ may not simultaneously be hydrogen.

In the above definition, lower alkyl and lower alkoxy denote those groups or moieties that contain 1 to 5, preferably 1 to 3, carbon atoms. Examples of lower alkyl groups are methyl, ethyl, n-propyl, isopropyl, n-butyl, sec-butyl, tert-butyl, amyl or isoamyl; and lower alkoxy groups are, for example, methoxy, ethoxy, isopropoxy, isobutoxy or tert-butoxy.

Halogen is, for example, fluorine, bromine or, preferably, chlorine.

$R_1$, $R_2$ and $R_3$ as alkyl groups may be straight chain or branched alkyl groups, e.g. methyl, ethyl, n-propyl, isopropyl, n-butyl, sec-butyl, tert-butyl, amyl, isoamyl, n-hexyl, 2-ethyl-n-hexyl, n-heptyl, n-octyl, isooctyl, n-nonyl, isononyl or n-dodecyl.

$R_1$, $R_2$ and $R_3$ as substituted alkyl groups are preferably cyanoalkyl, haloalkyl, hydroxyalkyl or alkoxyalkyl, each containing preferably a total of 2 to 6 carbon atoms, e.g. β-cyanoethyl, β-chloroethyl, β-hydroxyethyl, β-methoxyethyl or β-ethoxyethyl.

$R_1$, $R_2$ and $R_3$ as cycloalkyl are cyclopentyl, cycloheptyl or, preferably, cyclohexyl. The cycloalkyl radicals may contain one or more $C_1$–$C_4$alkyl moieties, preferably methyl groups, and contain a total of 5 to 10 carbon atoms.

$R_1$, $R_2$ and $R_3$ as phenalkyl preferably contain 7 to 9 carbon atoms and are normally α-methylbenzyl, phenethyl, phenisopropyl or, in particular, benzyl, which can also preferably be ring-substituted.

Preferred substituents of the benzyl and phenyl moiety of $R_1$, $R_2$ and $R_3$ are e.g. halogen, methyl or methoxy. Examples of such araliphatic and aromatic radicals are p-methylbenzyl, o- or p-chlorobenzyl, o- or p-tolyl, xylyl, o-, m- or p-chlorophenyl, and o- or p-methoxyphenyl.

A heterocyclic radical —$NR_2R_3$ is, for example, pyrrolidino, piperidino, pipecolino, morpholino, thiomorpholino or piperazino such as N-methylpiperazino, Preferred heterocyclic radicals —$NR_2R_3$ are pyrrolidino, piperidino or morpholino.

The substituents $R_1$, $R_2$ and $R_3$ are preferably cyclohexyl, phenyl, naphthyl, benzyl, phenethyl, cyano-lower alkyl, for example β-cyanoethyl, or lower alkyl, for example methyl or ethyl. —$NR_2R_3$ is also preferably pyrrolidinyl.

Useful sulfamide compounds are those of formula

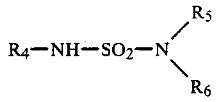 (2)

wherein $R_4$, $R_5$ and $R_6$ are each independently alkyl of not more than 5 carbon atoms which is unsubstituted or substituted by halogen, cyano or lower alkoxy; or $C_5$–$C_6$cycloalkyl, benzyl, phenethyl, phenyl or naphthyl; or —$NR_5R_6$ is pyrrolidino, piperidino or morpholino.

Preferred sulfamide compounds of formula (2) are those in which R is phenyl or naphthyl.

Particularly interesting sulfamide compounds are those of formula

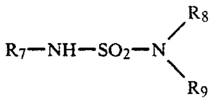 (3)

wherein $R_7$ is naphthyl or, preferably, phenyl, and $R_8$ and $R_9$ are each lower alkyl, for example methyl or ethyl.

The most preferred sulfamide compounds are N,N-dimethyl-N'-phenylsulfamide or N,N-dimethyl-N'-naphth-1-ylsulfamide.

Sulfamide compounds of formulae (1) to (3) and the preparation thereof are disclosed, for example, in German Offenlegungsschrift 2 727 776.

The colour formers suitable for use in the recording or copying material of this invention are known colourless or faintly coloured chromogenic compounds which, on coming into contact with the developers, become coloured or change colour. It is possible to use colour formers, or mixtures thereof, which belong e.g. to the classes of the azomethines, fluoranes, benzofluoranes, phthalides, azaphthalides, spiropyranes, spirodipyranes, leucoauramines, rhodamine lactams, triarylmethaneleuco dyes, carbazolylmethanes, chromenoindoles, chromenopyrazoles, phenoxazines, phenothiazines, quinazolines, as well as chromeno or chromano colour formers.

Examples of such suitable colour formers are: crystal violet lactone (Registered Trademark), 3,3-bis(aminophenyl)phthalides, 3,3-(disubstituted indolyl)phthalides, 3-(aminophenyl)-3-indolyl-phthalides, 3-(aminophenyl)-3-indolylazaphthalides, 6-dialkylamino-2-n-octylaminofluoranes, 6-dialkylamino-2-arylaminofluoranes, 6-dialkylamino-3-methyl-2-arylaminofluoranes, 6-dialkylamino-2- or -3-lower alkylfluoranes, 6-dialkylamino-2-dibenzylaminofluoranes, 6-N-cyclohexyl-N-lower alkylamino-3-methyl-2-arylaminofluoranes, 6-pyrrolidino-2-arylaminofluoranes, bis(aminophenyl)-furyl-, -phenyl- or -carbazolylmethanes, 3'-phenyl-7-dialkylamino-2',2'-spirodibenzopyranes, bis(dialkylamino)-benzhydrolalkyl- or -arylsulfinates, benzoyldialkylaminophenothiazines or benzoyldialkylaminophenoxazines.

The sulfamide compound eligible for use in the practice of this invention acts in the colour former system in particular as activator and is preferably present in conjunction with the developer. It ensures that the maximum colour strength of the temperature-sensitive colour former layer is reached at substantially lower temperatures than without the activator.

It is preferred to use the sulfamide compound in an amount of 5 to 60% by weight, preferably 15 to 40% by weight, based on the developer.

The developers for the colour former can be used by themselves alone or as mixtures in the heat-sensitive recording materials.

Typical examples of such developers are activated clays such as attapulgite, acid clay, bentonite, montmorillonite, activated clay, e.g. acid-activated bentonite or montmorillonite, and also zeolith, halloysite, silica, alumina, aluminium sulfate, aluminium phosphate, zinc chloride, zinc nitrate, kaolin or any clay, or acidic organic compounds, for example unsubstituted or ring-substituted salicylic acid or salicylates and their metal salts, or an acidic polymer, for example a phenolic polymer, an alkylphenol acetylene resin, a maleic acid/rosin resin or a partially or completely hydrolysed polymer of maleic acid and styrene, ethylene or vinyl methyl ether, or carboxypolymethylene.

Preferred developers are metal-containing or, most preferably, metal-free, phenolic compounds, for example 4-tert-butylphenol, 4-phenylphenol, methylene bis(p-phenylphenol), 4-hydroxydiphenyl ether, $\alpha$-naphthol, $\beta$-naphthol, 4-hydroxydiphenylsulfone, 4-hydroxy-4'-methyldiphenylsulfone, 4-hydroxy-4'-isopropoxydiphenylsulfone, methyl, ethyl, n-butyl or, preferably, benzyl 4-hydroxybenzoate, 4-hydroxyacetophenone, 2,2'-dihydroxydiphenyl, 4,4'-cyclohexylidenediphenol, 4,4'-isopropylidenediphenol, 4,4'-isopropylidene-bis(2-methylphenol), an antipyrene complex of zinc thiocyanate, a pyridine complex of zinc thiocyanate, a 2-methylimidazole complex of zinc thiocyanate, 4,4'-bis(hydroxyphenyl)-valeric acid, hydroquinone, pyrogallol, phloroglucinol, p-, m- and o-hydroxybenzoic acid, gallic acid, 1-hydroxy-2-naphthoic acid, as well as boric acid or organic, preferably aliphatic, dicarboxylic acids, for example tartaric acid, oxalic acid, maleic acid, citric acid, citraconic acid or succinic acid.

Particularly preferred developers are the phenols or zinc thiocyanate complexes disclosed, for example, in European patent application A-97 620.

The sulfamide compounds of formulae (1) to (3) are particularly suitable activators for heat-sensitive or thermoreactive recording materials. These materials comprise normally at least one support such as paper, synthetic paper or plastic sheet, and one or more temperature-sensitive layers present thereon which contain a colour former and an electron acceptor as developer for the colour former. In addition to the activator, the recording materials preferably contain a binder and/or wax.

Thermoreactive recording systems comprise, for example, heat-sensitive recording or copying materials or papers. These systems are used e.g. for recording information, for example in electronic computers, teleprinters or telewriters, or in recording and measuring instruments, e.g. electrocardiographs. The image (mark) formation can also be effected manually with a heated pen. Laser beams can also be used to produce heat-induced marks.

The thermoreactive recording material can be composed such that the colour former is dispersed or dissolved in one binder layer and the developer is dissolved or dispersed in the binder in a second layer. Another possibility comprises dispersing both the colour former and the developer in one layer. By means of heat the binder is softened at specific areas and the colour formers comes into contact with the developer (electron acceptor) at those points where heat is applied and the desired colour develops at once.

It is preferred to use fusible, film-forming binders for making the thermoreactive recording material. These binders are normally water-soluble, whereas the colour former, the developer and the activator are sparingly soluble or insoluble in water. The binder should be able to disperse and fix the colour former, the developer and the activator at room temperature.

When heated, the binder softens or melts, so that the colour former comes in contact with the developer and a colour is able to form. Examples of binders which are soluble, or at least swellable, in water are e.g. hydrophilic polymers, for example polyvinyl alcohol, polyacrylic acid, hydroxyethylcellulose, methyl cellulose, carboxymethyl cellulose, polyacrylamide, polyvinyl pyrrolidone, gelatin, starch, or etherified corn starch.

If the colour former, the developer and the activator are in two separate layers, it is possible to use water-insoluble binders, i.e. binders which are soluble in non-polar or only weakly polar solvents, for example natural rubber, synthetic rubber, chlorinated rubber, polystyrene, styrene/butadiene copolymers, polymethylacrylates, ethyl cellulose, nitrocellulose or polyvinyl carbazole. The preferred arrangement, however, is that in which the colour former, the activator and the developer are contained in one layer in a water-soluble binder.

The thermoreactive coatings may contain further auxiliaries. To improve the degree of whiteness, to facilitate the printing of papers, and to prevent the heated pen from sticking, the coatings may contain e.g. talcum, titanium dioxide, zinc oxide, aluminium hydroxide, calcium carbonate (e.g. chalk), clays or also organic pigments, for example urea/formaldehyde polymers. To effect the colour formation only within a limited temperature range, it is possible to add substances such as urea, thiourea, diphenyl thiourea, acetamide, acetanilide, stearylamide, phthalic anhydride, metal stearates, dimethyl terephthalate, phthalonitrile or other appropriate fusible products which induce the simultaneous melting of the colour former and the developer. Thermographic recording materials preferably contain waxes, e.g. carnauba wax, montan wax, paraffin wax, polyethylene wax, condensates of higher fatty acid amides and formaldehyde, or condensates of higher fatty acids and ethylenediamine.

The invention is illustrated by the following Examples, in which percentages are by weight, unless otherwise indicated.

EXAMPLE 1

A coating composition consisting of dispersion A and dispersion B.

To prepare dispersion A, 7.5 g of 4,4'-isopropylidenediphenol (bisphenol A) and 2.5 g of N,N-dimethyl-N'-phenylsulfamide are ground with 40 g of a 10% aqueous solution of polyvinyl alcohol (Polyviol 25/140) and 25 g of water to an average particle size of 2–4 $\mu$m.

To prepare dispersion B, 10 g of 2-phenylamino-3-methyl-6-N-cyclohexyl-N-methylaminofluorane are ground with 40 g of a 10% aqueous solution of polyvinyl alcohol and 25 g of water.

3 parts of dispersion A and 1 part of dispersion B are mixed and the mixture is applied to base paper to a coating weight of 3 $g/m^2$ after drying.

After drying and conditioning the thermographic paper, colour development is effected with a thermo printer (contact time: 0.1 sec) at different temperatures. The colour strength of the thermographic prints is determined by remission measurements.

COMPARISON EXAMPLE A

The coating composition is prepared as described in Example 1, using benzenesulfanilide instead of N,N-dimethyl-N'-phenylsulfamide.

When using N,N-dimethyl-N'-phenylsulfamide, the contact temperature (i.e. the temperature at which 5% of the maximum color strength is attained) is 90° C., and 50% of the maximum colour strength is attained at 110° C. When using benzenesulfanilide, the contact temperature is 100° C. and 50% of the maximum colour strength is attained at 140° C.

EXAMPLE 2

A coating composition consisting of dispersion C and dispersion D.

Dispersion C 7.5 g of a zinc thiocyanate/2-methylimidazole complex and 2.5 g of N,N-dimethyl-N'-naphth-1-ylsulfamide are ground with a 10% aqueous solution of polyvinyl alcohol (Polyviol 25/140) and 25 g of water to an average particle size of 2–4 μm.

Dispersion D 10 g of 3,3-bis(4'-dimethylaminophenyl)-6-dimethylaminophthalide are ground with 40 g of a 10% aqueous solution of polyvinyl alcohol (Polyviol 25/140) and 25 g of water to an average particle size of 2–4 μm.

3 parts of dispersion C and 1 part of dispersion D are mixed and the mixture is applied to base paper to a coating weight of 3 $g/m^2$ after drying.

After drying and conditioning the thermographic paper, colour development is effected with a thermo printer (contact time: 0.1 sec) at different temperatures. The colour strength of the prints is determined by remission measurements.

COMPARISON EXAMPLE 2a

The coating composition is prepared as described in Example 2, using benzenesulfanilide instead of N,N-dimethyl-N'-naphth-1-ylsulfamide.

COMPARISON EXAMPLE 2b

The coating composition is prepared as described in Example 2, using 10 g of a zinc thiocyanate/2-methylimidazole complex and without the sulfamide compound (activator).

When using N,N-dimethyl-N'-naphth-1-ylsulfamide, the contact temperature is 100° C. and 50% of the maximum colour strength is attained at 140° C.

When using benzenesulfanilide, the contact temperature is 120° C. and 50% of the maximum colour strength is attained at 170° C.

Without an activator, the contact temperature is 150° C. and 50% of the maximum colour strength is not attained until the temperature is 190° C.

What is claimed is:

1. A heat-sensitive recording material having a color reactant system which comprises (1) a color former, (2) a developer for the color former selected from the group consisting of a metal-free phenolic compound and a zinc thiocyanate complex, and (3) a sulfamide compound of the formula

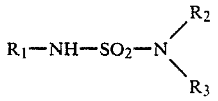

wherein $R_1$, $R_2$ and $R_3$ are each independently lower alkyl, cyano-lower alkyl, cyclohexyl, phenyl, naphthyl, benzyl or phenethyl, or $-NR_2R_3$ is pyrrolidino, piperidino or morpholino.

2. A recording material of claim 1, wherein $R_1$, $R_2$ and $R_3$ are each independently lower alkyl, cyano-lower alkyl, cyclohexyl, phenyl, naphthyl, benzyl or phenethyl.

3. A recording material of claim 1, wherein $R_1$ is phenyl or naphthyl.

4. A recording material of claim 1, wherein $R_1$ is phenyl or naphthyl and $R_2$ and $R_3$ are each lower alkyl.

5. A recording material of claim 4, wherein $R_2$ and $R_3$ are each methyl.

6. A recording material of claim 1, which comprises a support which contains in at least one layer the color former, the developer for said color former, at least one binder, and the sulfamide compound.

* * * * *